(12) United States Patent
Mangiameli et al.

(10) Patent No.: US 6,587,806 B2
(45) Date of Patent: Jul. 1, 2003

(54) METHOD AND SYSTEM FOR DETERMINING TIME TO SORT MAILPIECES

(75) Inventors: Cindy Mangiameli, Southbury, CT (US); Lyle W. Shaw, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 181 days.

(21) Appl. No.: 09/752,067

(22) Filed: Dec. 29, 2000

(65) Prior Publication Data

US 2002/0123855 A1 Sep. 5, 2002

(51) Int. Cl.[7] .............................................. G06F 15/21
(52) U.S. Cl. ........................ 702/128; 700/216; 209/584
(58) Field of Search .................... 702/128; 700/216, 700/231, 236, 237; 705/29, 34, 39; 209/584, 900; 271/3.14, 4.01

(56) References Cited

U.S. PATENT DOCUMENTS

| | | | | |
|---|---|---|---|---|
| 3,637,076 A | | 1/1972 | Halopoff et al. | 209/124 |
| 5,043,908 A | | 8/1991 | Manduley et al. | 364/478 |
| 5,068,797 A | * | 11/1991 | Sansone et al. | 700/219 |
| 5,072,401 A | * | 12/1991 | Sansone et al. | 700/219 |
| 5,910,896 A | | 6/1999 | Hahn-Carlson | 364/479.01 |
| 6,032,122 A | * | 2/2000 | Gertner et al. | 345/700 |
| 6,337,451 B1 | * | 1/2002 | De Leo | 209/584 |

* cited by examiner

Primary Examiner—Kamini Shah
(74) Attorney, Agent, or Firm—Angelo N. Chaclas; Charles R Malandra, Jr.

(57) ABSTRACT

A system and method for estimating an amount of time required to complete a mail processing job. A control module receives and maintains real time data of quantity of mailpieces and time to sort the quantity of mailpieces during a first sort. A progress module processes the data to determine an estimated time to complete one or more second sorts of the mailpieces. Depending upon the estimated time of completion of the one or more sorts, the progress module advises an operator on whether to change the job schedule.

8 Claims, 2 Drawing Sheets

METHOD AND SYSTEM FOR DETERMINING TIME TO SORT MAILPIECES

BACKGROUND OF THE INVENTION

The invention relates to determining time of delivery of mailpieces. More particularly, the invention relates to a system and method for determining an amount of time required to complete a mail processing job.

Typical mailpiece sorting equipment incorporates a feeding mechanism for feeding mailpieces, a separating mechanism for separating the mailpieces from each other, a reading means for reading the information on the mailpieces, a mailpiece transport mechanism for transporting the mailpieces to compartments or bins, compartments or bins for receiving the mailpieces, and software for making choices regarding placement of the mailpieces into the compartments and a control device.

The operation of automated sorting equipment typically entails an operator placing an armload of mail that has been edge aligned onto the feeder portion of the system. The mailpieces are fed into the sorting system and sorted into bins or compartments. Often, when one or more bins become full, the sorting system stops, and the bins are emptied into a mail tray. From the mail tray, the mailpieces are sorted again, in which case the sorting apparatus is restarted and sorting continues.

Typically, mailpieces are sorted multiple times because there are fewer bins in a sorting system than delivery points (for example addresses). So, in a first sort (rough sort) each bin may represent all the mailpieces addressed to a particular neighborhood. In a second sort (fine sort), each bin may represent all of the mailpieces addressed to each street from one neighborhood. In a third sort, each bin may represent all of the mailpieces addressed to each street from another neighborhood. Delivery points will almost invariably outnumber the number of bins in the sorting apparatus, which forces at least a second pass (or sort). For example, a neighborhood having 50 addresses, 5 streets and 10 addresses per street, and a sorting system with 10 bins, cannot possibly sort mailpieces for each address in a single sort. To compensate for this, the sorting apparatus is programmed to have a first sort based upon the street where the addresses of the mailpieces are directed. Thus, bin 1 can collect mailpieces destined for the first street of the neighborhood. Bin 2 can collect mailpieces destined for the second street, while bins 3, 4, and 5 can collect mailpieces for streets 3, 4, and 5, respectively. Once the mailpieces have been sorted by street, the mailpieces from each bin (street) can be sorted a second time by address, where each bin now represents a particular address. This process is referred to as a "job" and each "job" and has its own sort scheme (e.g. several passes), as described above. Often a job has a specific time requirement where the mailpieces need to be sorted in time for pickup by a mail delivery truck. In these situations a job may be 30% through its first pass and the delivery truck will be showing up at any minute. If it is going to take 40 minutes to finish the first pass, then the delivery truck will have to wait or leave without any mailpieces, since the fine sorts have not been started. What is needed is a method and a system for estimating the amount of time required to complete a mail processing job so that sort schedules (jobs) can adjusted to meet schedules.

SUMMARY OF THE INVENTION

Deficiencies in the prior art are overcome, and an advance in the art is achieved with a system for estimating a time to sort mailpieces for a job. The system has a control module for receiving and maintaining real time data of a quantity of mailpieces and a time to sort the quantity of mailpieces during a first sort. It also has a progress module for estimating a time to complete one or more second sorts of the mailpieces, based upon the quantity of mailpieces and the time to sort the quantity of mailpieces during the first sort.

Operationally, the system measures a quantity of mailpieces and a time to sort the quantity of mailpieces during a first sort. It determines a time to complete one or more second sorts of the mailpieces, based upon the quantity and the time to sort the quantity of mailpieces during the first sort. Depending upon the estimated time of completion of the one or more sorts, the progress module advises an operator on whether to change the job schedule.

DETAILED DESCRIPTION

Figure 1:
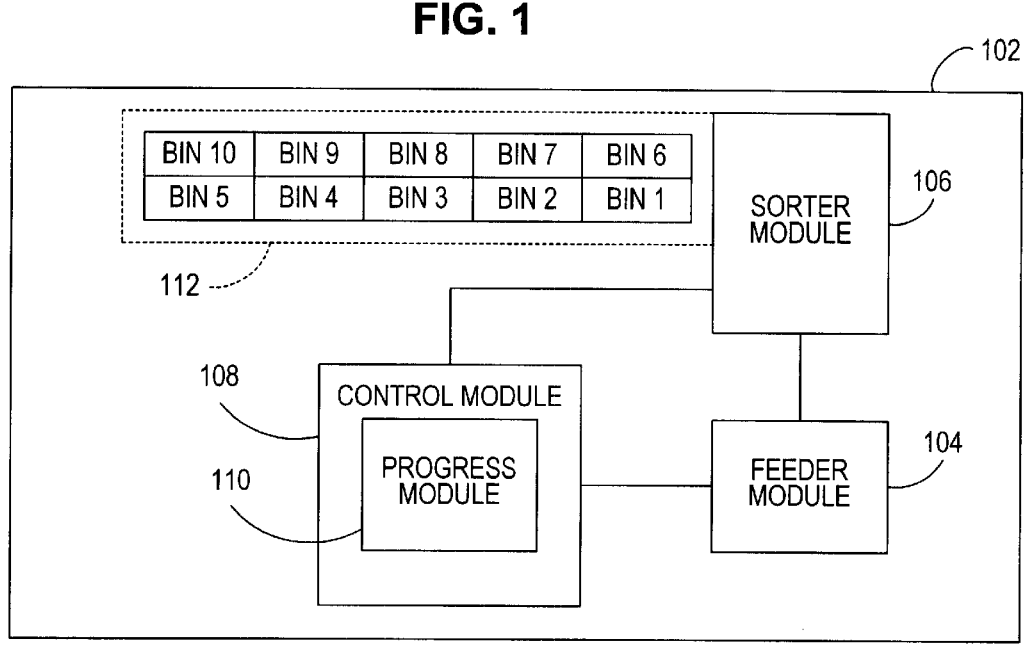
FIG. 1 presents a block diagram of a system in accord with the principles disclosed herein.

FIG. 1 shows components of a sorting system 102, which incorporates a progress module 110 of the present invention. Sorting system 102 may generally have a control module 108, a sorter module 106, a feeder module 104, and bin modules 112. FIG. 1 is an illustration of a 10 bin configuration. It should be realized that progress module 110 can be implemented in various types of sorting systems having various bins 112, module configurations, and job requirements.

A job in the context of this illustration defines a series of sort schemes. Each sort scheme defines a relationship between delivery points of mailpieces, and final bin destinations defined for that particular sort. As mailpieces move through sorting system 102, delivery points are determined and final bin destinations are evaluated based on the particular sort scheme being run. The first sort scheme is known as the rough sort, which breaks the sorting of the mail into logical groups of delivery points. Subsequent fine sorts can be run after the rough sort to further break these groups of delivery points into individual delivery points sorted to a bin. The job includes predefined job parameters, such as a time that an operator is expected to take to clear all of the mailpieces out of bins 112, a time that the operator is expected to take to load sorting system 102 for the fine sorts, and a number of fine sorts (second passes) that must be performed to complete the job.

Control module 108 is a general-purpose computer having a processor, memory, counters, clocks, internal communications busses, a user interface such a mouse, keyboard and monitor, and a communications module for interacting with external modules. Also included in control module 108 is a number of software and hardware modules providing the functionality to control, communicate, and process information shared among the modules within sorting system 102.

Figure 2:
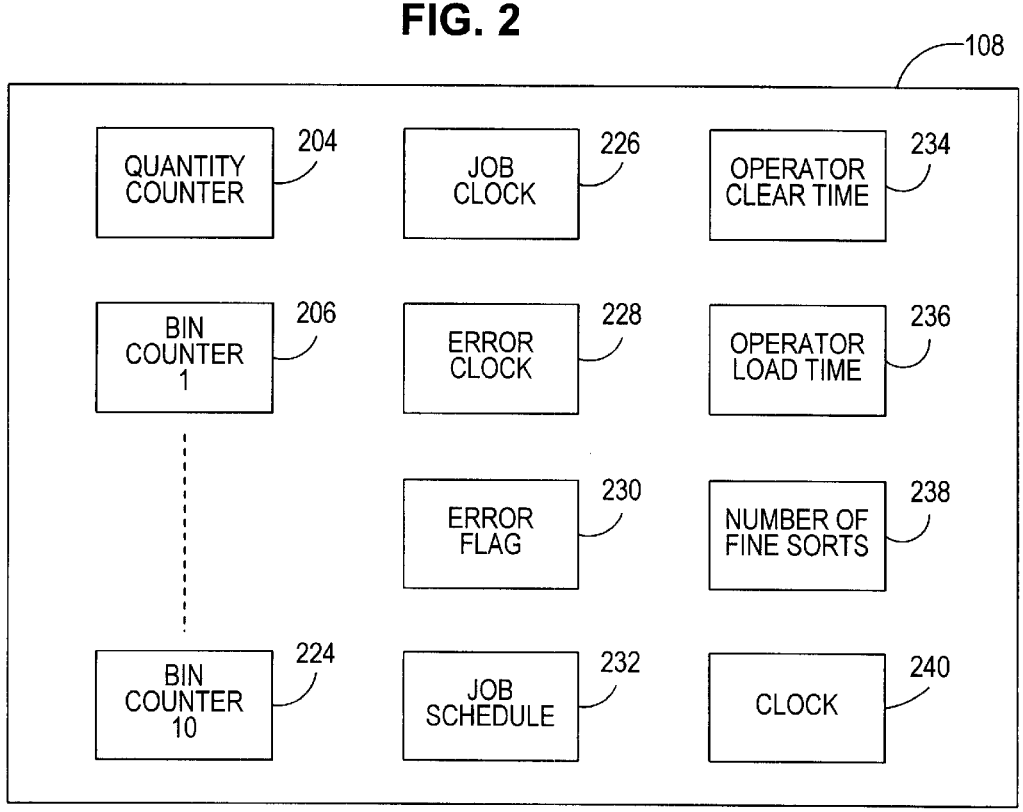
FIG. 2 presents a detailed diagram of control module of FIG. 1.

Referring to FIG. 2, control module 108 has a quantity counter 204 that is representative of a total quantity of mailpieces sorted during the sorting process. Every time a mailpiece passes through feeder module 104, control module 108 receives a signal, from feeder module 104, to update quantity counter 204. Accordingly, as mailpieces are sorted through sorting system 102, counter 204 is continuously updated.

Additionally, control module 108 includes bin counters 206–224 that represent real time quantities of mailpieces sorted to each bin 112. Control module 108 receives a signal, from sorter module 106, indicating that a mailpiece has been delivered to a particular bin. In response, control module 108 increases the appropriate bin counter 206–224 and stores the value in program memory.

Two clocks, a job clock 226 and an error clock 228 are included in control module 108 to track the run time and error time (down time) of sorting system 102. When sorting system 102 starts sorting, control module 108 starts job clock 226. Job clock 226 measures the time that sorting system 102 is running. Error clock 228 measures the time that sorting system 102 stops running during a job. Job and error clocks 226–228 toggle back and forth, depending upon whether sorting system 102 is running or not running. Control module 108 automatically starts job clock 226 when sorting system 102 starts the sorting process, and pauses job clock 226 when it receives, from sorter module 106, a signal setting an error flag 230 to "error". Control module 108 also has a clock 240 that represents actual time of the day. This clock is used to determine if the job is on schedule. Both error flag 230 and clock 240 are described in more detail below.

Error flag 230, is set to "no-error" during normal running conditions of sorting system 102, and is set to "error" when an error occurs in sorting system 102. Sorter module 106 determines whether error flag 230 is set to "error" or "no-error". When sorting system 102 starts running, error flag 230 is automatically set to "no-error" by control module 108. If, during sorting, sorting system 102 encounters a failure or problem, sorter module 106 detects the failure or problem and sends an error signal to control module 108. Control module 108 responds by setting error flag 230 to "error" and by switching sorting system 102 from running state to error state. This stops job clock 226 and starts error clock 228. Control module 108 remains in error-state until it receives further signals indicating that the error has been cleared. Accordingly, while in error state, sorting system 102 stops sorting mailpieces. When control module 108 receives a signal from sorter module 106 setting the error flag to no-error, control module 108 stops error clock 228, starts job clock 226, and restarts sorting system 102.

An operator clear time 234, an operator load time 236, and a number of fine sorts 238 are also included in control module 108. Before an operator begins a job, job parameters are entered into control module 108 via the user interface. The parameters populate operator clear time 234, operator load time 236, and number of fine sorts 238. These parameters are typically entered by a supervisor and are transparent to the operator of sorting system 102. Alternatively, these parameters could be determined by the operator. For example, when an operator begins a job, using the user interface, he or she could enter a time that he or she expects to take to clear all of the mailpieces out of bins 112. The operator could also enter a time that he or she expects to take to load sorting system 102 for the fine sorts. After the rough sort (first pass), the operator could enter the number of fine sorts (second passes) that must be performed to complete the job. This number would be determined by counting the number of bins 112 that have mailpieces.

Control module 108 also includes a job schedule 232. t stores a time that a particular job is scheduled for completion. For example, if the job had to be complete by 10:00 AM for a mail truck pickup, then the operator would enter 10:00 AM into control module 108, using the user interface.

Referring back to FIG. 1, sorter module 106 is generally responsible for monitoring the number of mailpieces delivered to each bin 112, and monitoring sorting system 102 for errors. As mailpieces are delivered to each bin 112, sorter module 106 sends a signal to control module 108 indicating that a particular bin 112 has received a mailpiece. Accordingly, control module 108 increments the appropriate bin counter 206–224 and, thus maintains a real time quantity of mailpieces per bin 112. Sorter module 106 is coupled to numerous sensors located throughout sorting system 102, which detect, for example, the quantity of mailpieces being sorted and the quantity of mailpieces, if any, delivered to each bin 112.

More specifically, sorter module 106 monitors the transfer of mailpieces as they move through sorting system 102 to their bin destinations. As each mailpiece arrives at its bin 112, they are detected by sensors and processed by sorter module 106, which communicates to control module 108, that a mailpiece has reached its destination and identifies which bin. As mentioned above, control module 108 keeps track of the quantity of mailpieces that have been sorted to their respective bins 112. Accordingly, during the sorting process, bin counters 206–224 are updated in real time and their results are stored in program memory of control module 108.

Another function of sorter module 106 is the monitoring of sorting system 102 for system failures or problems. If a failure or problem occurs in system 102 during sorting, sorter module 106 sends an error signal to control module 108, which sets error flag 230 to "error". As mentioned above, when an error signal is received by control module 108, it pauses sorting system 102, until further notification from sorter module 106. When the error is cleared (e.g. sorting system 102 is repaired), sorter module 106 sends a "no-error" signal to control module 108 to clear the error state, so that control module 108 can restart sorting system 102.

Feeder module 104 is responsible for feeding mailpieces into sorting system 102. Included in feeder module 104 are sensors for detecting mailpieces that have begun the sorting process. Feeder module 104 processes sensor information and sends signals to control module 108. The signals indicate to control module 108 that a mailpiece has begun the sorting process. In response to the signal, control module 108 increments quantity counter 204, as described above. During the sorting process, signals are sent to control module 108 every time a mailpiece begins the sorting process. Accordingly, quantity counter 204 is updated in real time and, thus represents a running total of mailpieces being sorted. Quantity counter 204 continues to be incremented until the last mailpiece of the first pass of the job has been sorted. Until the last mailpiece begins the sorting process, sensors continually detect the quantity of mailpieces being sorted and feeder module 104 processes the sensors' information and communicates this information to control module 108. At the time of completion of the first pass of the job, the quantity of mailpieces represents the total quantity of mailpieces for this particular job. Module 40 processes this information, where it is stored in memory of control module 108.

Progress module 110 monitors the progress of a particular job being processed by sorting system 102. During the sorting process, progress module accesses various counters 204–224 and clocks 226–228, described above, for use in various computations that determine the progress of the current job. Advantageously, progress module 110 performs various real time calculations, such as an average amount of time sorting system 102 take to sort each individual mailpiece moving through the system, and of an average error time per mailpiece. Progress module 110 continuously polls counters 204–224 and clocks 226–228 so that the calculations represent the current status of the mailpieces being sorted by sorting system 102. To illustrate the type of functions that may be employed by progress module 110, consider the set of variables:

B1=Bin Counter 1
B2=Bin Counter 2
through to
B10=Bin Counter 10
Q=Quantity Counter
J=Job Clock
E=Error Clock
F=Number of Fine Sorts
Oc=Operator Clear Time
Ol=Operator Load Time
S=Job Schedule These variables represent data entered by the supervisor, operator and/or data detected by the various modules, all of which are maintained by control module 108, and are described in the above paragraphs. The following formula is used to determine the average time for a mailpiece to be processed by sorting system 102 for a particular job:

Average Time Per Mailpiece=Total Running Time/Total Number Of Mailpieces

Average Time Per Mailpiece=$J/Q$

Q=Quantity Counter
J=Job Clock

Because the variables are continuously polled, this calculation will change, if either variable J or Q changes. Variable Q (quantity counter) is incremented every time a mailpieces begins the sorting process. Variable J will change from one polling cycle to another if there is an error with sorting system 102 and job clock 226 (variable J) is paused. During the sorting process, sorting system 102 may malfunction or jam, causing sorting system 102 to momentarily pause. If this occurs, the calculation of the average time per mailpiece will be skewed. To compensate for this possibility, progress module 110 provides the functionality to calculate an average error time per mailpiece. The following formula is provided to calculate an average error time per mailpiece:

Average Error Time Per Mailpiece=(Total Time In Error State)/(Total Quantity Of Mailpieces)

Average Error Time Per Mailpiece=$E/Q$

E=Error Clock
Q=Quantity Counter

Thus, to determine the average time for a mailpiece to be sorted, while compensating for any temporary malfunctions or jams of sorting system 102, the following formula is utilized by progress module 110:

Total Time Per Mailpiece=(Average Time Per Mailpiece)+(Average Error Time Per Mailpiece)

Total Time Per Mailpiece=$(J/Q)+(E/Q)$

Progress module 110 continuously determines values for these functions in order to maintain a real time value of the total time for a mailpiece to be sorted. Knowing the total time for a mailpiece to be sorted, the quantity of mailpieces being sorted, and the job schedule, progress module 110 can calculate whether sorting system 102 will complete the job on schedule. Progress module 110 uses the following formula to determine the time to fine sort all mailpieces:

Time To Fine Sort All Mailpieces=Number Of Fine Sorts×(Operator Clear Time+Operator Load Time)+(Quantity Of Mailpieces×Total Time Per Mailpiece)

The result of the above formula provides the time to fine sort all mailpieces. This time is compared to job schedule 232 to determine whether sorting system 102 is on schedule to complete the job. Depending upon the results of this comparison, control module 108 presents, via the user interface, instructions to the operator. For example, if the results of the comparison are such that the time to fine sort all mailpieces is greater than the job schedule 232, then control module 108 will present the operator with a message indicating that the rough sort (first pass) should be stopped and a fine sort (second pass) started.

The following discussion discloses an operational schema where sorting system 102 performs a particular job, and progress module 110 monitors the progress of the job to determine whether sorting system 102 is on schedule.

Figure 3:
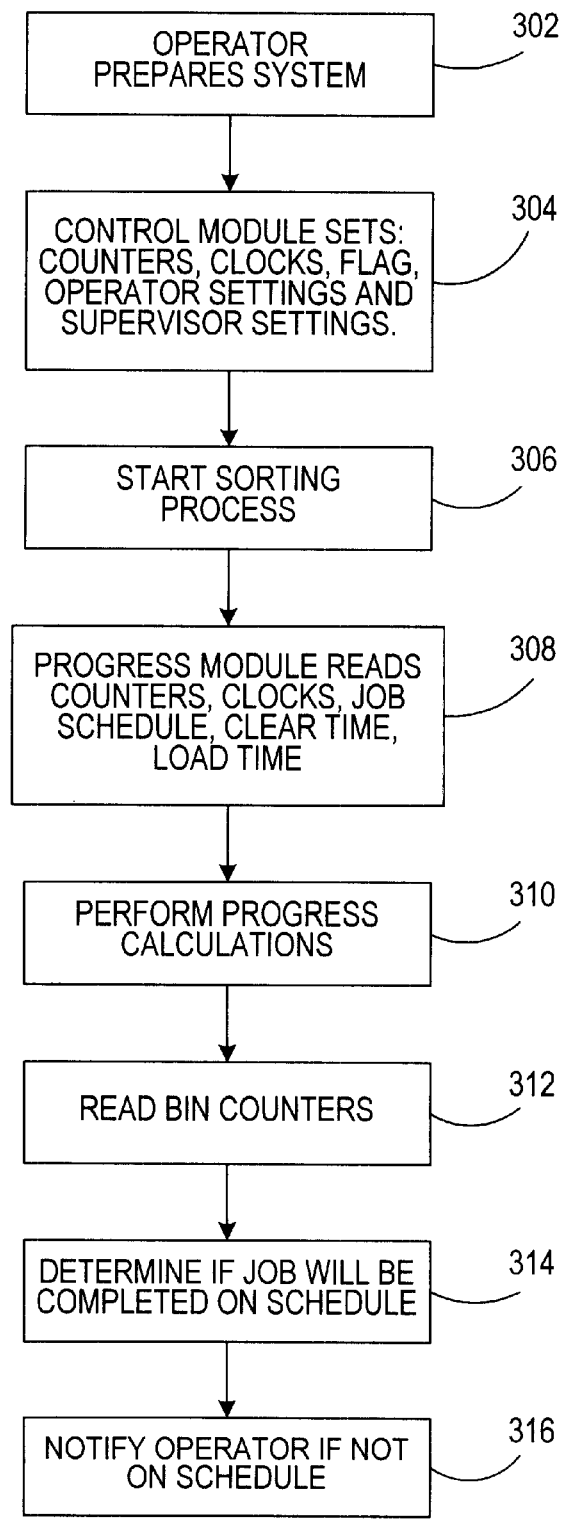
FIG. 3 shows a flowchart of a process carried out in the system presented in FIG. 1.

Referring to FIG. 3, at block 302, an operator loads sorting system 102 with mail and enters a job schedule set for 10:00 AM into control module 108, via the user interface. The job schedule time (10:00 AM) is stored in job schedule 232 of control module 108. The supervisor enters a "job", which populates operator clear time 234 and operator load time 236. For the purposes of this illustrative embodiment, the operator clear time 234 is 60 seconds and the operator load time 236 is 30 seconds.

At block 304, control module 108 automatically sets error flag 230 to no-error, job clock 226 to 0, error clock 228 to 0 and counters 204–224 to 0. In response to the operators commands in block 302, control module 108 sets the operator clear time 234 to 60 seconds and the operator load time 236 to 30 seconds. Progress module 110 reads the data stored in job schedule 232, operator clear time 234, operator load time 236, for use in the calculations discussed below.

At block 306, using the user interface, the operator starts the sorting process, which starts job clock 226. Once the system is started, sorter module 106 monitors the number of mailpieces delivered to each bin 112 and monitors sorting system 102 for errors. Every time that a mailpiece is delivered to a bin 112, sorter module 106 sends a signal to control module 108 indicating that a particular bin 112 has received a mailpiece. Control module 108 reacts by incrementing the appropriate bin counter 206–224. This process continues until every mailpiece has been delivered to its appropriate bin 112, or until control module 108 determines that the job will not be met on time, at which time control module 108 advises the operator to stop the rough sort (first pass) and start the fine sort (second pass) to meet the job schedule. For the purpose of this illustration, before the completion of the first sort (rough sort), sorting system 102 yields the following mailpiece sort:

| | |
|---|---|
| Bin 1 | 100 mailpieces |
| Bin 2 | 200 mailpieces |
| Bin 3 | no mailpieces |

-continued

| Bin 4 | 300 mailpieces |
| Bin 5 | no mailpieces |
| Bin 6 | 100 mailpieces |
| Bin 7 | no mailpieces |
| Bin 8 | 100 mailpieces |
| Bin 9 | 100 mailpieces |
| Bin 10 | 100 mailpieces |

Concurrently, as the bin counters 206–224 are being updated, feeder module 104 is detecting the number of mailpieces being sent through sorting system 102. Additionally, feeder module 104 sends a signal to control module 108, which increments quantity counter 204. Moreover, sorter module 106 monitors sorting system 102 for errors. Errors can be for example paper jams, or equipment failure. If sorter module 106 detects an error, the module sends an error signal to control module 108 indicating that an error occurred. Control module 108 reacts by setting error flag 230 to error, starting error clock 228, stopping job clock 226, and pausing sorting system 102.

Continuing from the above illustration, during the sorting process a mailpiece got jammed in feeder module 104 and sorter module 106 reacted by sending an error signal to control module 108, which resulted is a stoppage of sorting system 102. Typically, under this circumstance, the operator removes the jammed mailpiece. While the operator is working on removing the mailpiece, error clock 228 is timing the "down time" of sorting system 102. Accordingly, job clock 226 is pause so that job clock 226 does not represent any "down time".

To continue with this illustration, if it took the operator 120 seconds to clear the jam and restart sorting system 102, then the error clock 226 would have a value equal to 120 seconds. Additionally, the error flag 230 would be reset to no-error, and the job clock 226 would continue from the time that it left off at when sorting system 102 was paused.

Continuing with the illustration, quantity counter 204 is 1000 mailpieces, job clock 226 is 900 seconds, job schedule 232 is 10:00 AM, operator clear time 234 is 60 seconds, operator load time 236 is 30 seconds, and bin counter 1 through bin counter 10 have the values shown above.

At block 308, progress module 110 reads each of the counters 204–224, clocks 226–228, job schedule 232, and operator clear time 234, operator load time 236, in control module 108.

At block 310 progress module 110 performs calculations to determine whether the job is on schedule, or whether the rough sort (first pass) of the job should shortened or changed to meet job schedule 232. The data read in block 308 is applied to the following formulas:

$$\text{Average Time Per Mailpiece} = J/Q$$

J=job clock 226 is 900 seconds, and
Q=quantity counter 204 is 1000
Progress module 110 performs the above calculation and determines that sorting system 102 takes an average of 0.9 seconds for each mailpiece to be sorted.

Next, progress module 110 calculates the average error time using the following formula:

$$\text{Average Error Time Per Mailpiece} = E/Q,$$

E=Error Clock 226 is 120 seconds, and
Q=Quantity Counter Value 204 is 1000 mailpieces.
The above calculation determines that sorting system 102 has an average error (down time) of 0.12 seconds for each mailpiece being sorted. Progress module 110 then calculates the total time per mailpiece using the following formula:

$$\text{Total Time Per Mailpiece} = (J/Q) + (E/Q) = 0.9 + 0.12 = 1.02 \text{ seconds per mailpiece.}$$

At block 312, progress module 110 reads the bin counters 206–224 (1 through 10) to determine which bins 112 require a fine sort to be run. As indicated above, bins 1, 2, 4, 6, 8, 9, and 10 each have mailpieces and, thus require a fine sort. Progress module 110 calculates the time required to fine sort all of the mailpieces that have already been rough sorted, using the following formula:

$$\text{Time To Fine Sort All Mailpieces} = (\text{Number Of Fine Sorts} \times (\text{Operator Clear Time} + \text{Operator Load Time})) + (\text{Quantity Of Mailpieces} \times \text{Total Time Per Mailpiece})$$

Number Of Fine Sorts=7
Operator Clear Time=60 seconds
Operator Load Time=30 seconds
Quantity Of Mailpieces=1000
Total Time Per Mailpiece=1.02 seconds
The result of this calculation is 1650 seconds, or 27.5 minutes.

At block 314, progress module 110 retrieves the time from job schedule 232, which in this illustration is 10:00 AM. Progress module 110 subtracts the calculated time to fine sort all mailpieces from job schedule 232. The result is a time that the rough sort should be started by, in order to meet the 10:00 AM time of delivery. In this illustration, to meet job schedule 232, the time to start the rough sort is 9:32.5 AM, which is determined by 10:00AM–27.5 minutes. Advantageously, the operator can stop the rough pass (first pass) before its completion to allow time for fine sorts (second pass), so that there is at least some mailpieces to produce for the 10:00 AM deadline.

At block 316, progress module retrieves the actual time of the day from clock 240 and compares it to the time that the rough sort must start (9:32.5 AM) in order to meet job schedule 232 (10:00 AM). When the time of day clock 240 equals 9:32.5 AM, control module 108 notifies the operator, via the user interface, that the rough sort must be started now, in order to meet the job schedule.

The above presents various principles and features of the invention through descriptions of various embodiments. It is understood that skilled artisans can make various changes and modifications to the embodiments without departing from the spirit and scope of this invention, which is defined by the following claims.

What is claimed is:

1. A method for determining a period of time to perform a sorting operation comprising the steps of:
   measuring a quantity of mailpieces to be sorted;
   measuring a first time interval to perform a first sort of the quantity of mailpieces;
   estimating a second time interval to perform a second sort of the quantity of mailpieces as a function of the quantity of mailpieces to be sorted and the first time interval;
   determining an average processing time interval for each mailpiece of the quantity of mailpieces the average processing time interval being a function of the quantity of mailpieces;

determining a malfunction during a sorting process;

calculating an average error time for each mailpiece that is a function of the malfunction and the quantity of mailpieces;

modifying the average processing time interval as a function of the average error time to generate an-updated time interval;

comparing the second Urns interval to the updated time interval; and outputting a message signal based on the comparing step.

2. The method as recited in claim 1, further comprising the step of determining a quantity of additional sorts based on the quantity of mailpieces.

3. The method as recited in claim 1, further comprising the steps of:

setting a job clock based on the quantity of mailpieces; and setting an error clock.

4. The method as recited in claim 1, further comprising the steps of:

establishing a sort time interval indicative of an expected time interval to complete the sorting operation; and updating the sort time interval as a function of first time interval.

5. The method as recited in claim 1, further comprising the steps of:

establishing bin counters to calculate a quantity of mailpieces in a particular bin; and updating the bin counter as a function of the sorting process.

6. The method as recited in claim 1, further comprising the step of:

establishing an operator load time period based on the quantity of mailpieces.

7. The method as recited in claim 1, further comprising the step of:

establishing a sorting procedure such that mailpieces from bins with a largest number of mailpieces have priority.

8. The method as recited in claim 2, further comprising the step of:

establishing a job sorting interval that is representative of the amount of time required to perform sorting of a selected quantity of mailpieces.

* * * * *